United States Patent [19]

Sabee

[11] 4,276,336
[45] * Jun. 30, 1981

[54] MULTI-APERTURED WEB WITH INCREMENTAL ORIENTATION IN ONE OR MORE DIRECTIONS

[75] Inventor: Reinhardt N. Sabee, Appleton, Wis.

[73] Assignee: Sabee Products, Inc., Appleton, Wis.

[*] Notice: The portion of the term of this patent subsequent to May 8, 1996, has been disclaimed.

[21] Appl. No.: 32,067

[22] Filed: Apr. 23, 1979

[51] Int. Cl.³ .............................. B28B 1/48; B32B 3/10
[52] U.S. Cl. ................................. 428/132; 264/154; 264/284; 264/294; 428/180; 264/288.4
[58] Field of Search ................ 264/147, 154, 290.2, 264/284, 288.4, 289, 287, 294, 210; 428/134, 180, 132

[56] References Cited

U.S. PATENT DOCUMENTS

| | | | |
|---|---|---|---|
| 3,137,746 | 6/1964 | Seymour et al. | 428/134 |
| 3,386,876 | 6/1978 | Wyckoff | 428/134 |
| 3,488,415 | 1/1970 | Patchell et al. | 428/134 |
| 3,496,259 | 2/1970 | Guenther | 264/147 |
| 3,515,778 | 6/1970 | Fields et al. | 264/147 |
| 3,554,853 | 1/1971 | Mercer et al. | 428/134 |
| 3,616,154 | 10/1971 | Dow et al. | 428/134 |
| 3,666,609 | 5/1972 | Kalwaites et al. | 428/134 |
| 3,746,607 | 7/1973 | Harman et al. | 264/147 |
| 3,881,381 | 5/1975 | Kalwaites | 428/134 |
| 3,922,329 | 11/1975 | Kim et al. | 264/147 |
| 4,025,601 | 5/1977 | Keith | 264/288.4 |
| 4,059,713 | 11/1977 | Mercer | 264/167 |
| 4,079,114 | 3/1978 | Bonner | 264/147 |
| 4,116,892 | 9/1978 | Schwarz | 264/49 |
| 4,152,479 | 5/1979 | Larsen | 264/167 |
| 4,153,664 | 5/1979 | Sabee | 264/282 |

FOREIGN PATENT DOCUMENTS 46-6200 2/1971 Japan ........................ 428/134

Primary Examiner—Jay H. Woo
Attorney, Agent, or Firm—Henry C. Fuller

[57] ABSTRACT

A thermoplastic non-woven net fabric and a method of making the same. The fabric includes a plurality of apertures with the apertures surrounded by axially drawn, biaxially drawn and undrawn areas. In one method, the web is perforated and then drawn by one or more pairs of helical rollers. The differential drawing of the perforated web greatly increases the tensile strength, area and drapability of the fabric. The apertures make the fabric suitable for use in garments, pillowcases, sheets, sterile wraps and is a breathable waterproof fabric for use in rain gear and tents. Two layers of the fabric can be used to form a pouch or carrier for conditioning agents such as a fabric softener for a laundry dryer, the softener agent being controllably released through the apertures.

4 Claims, 13 Drawing Figures

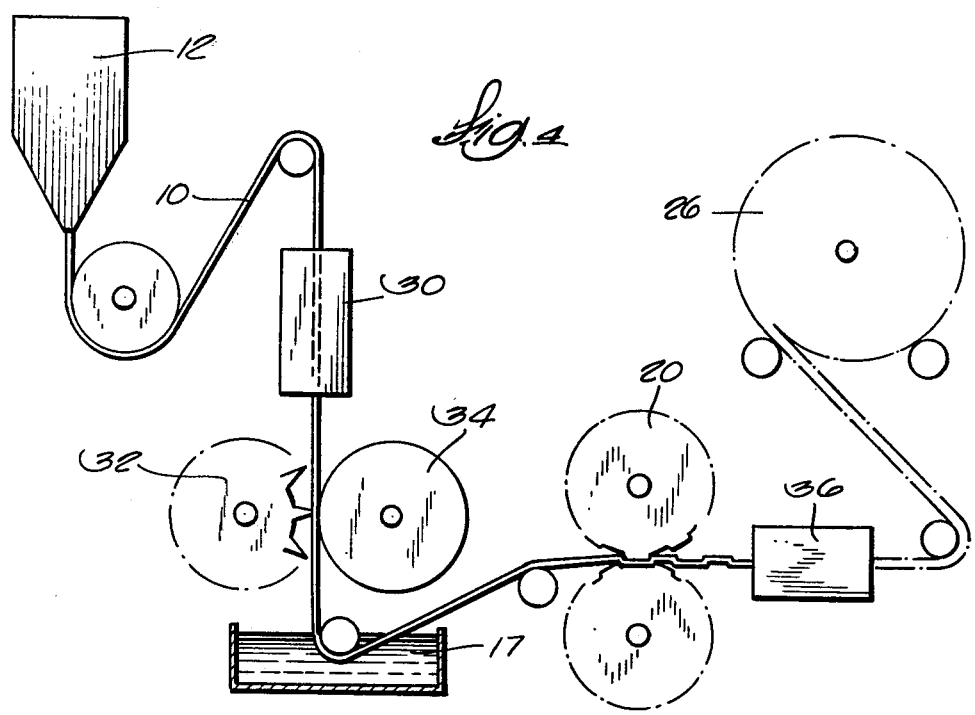
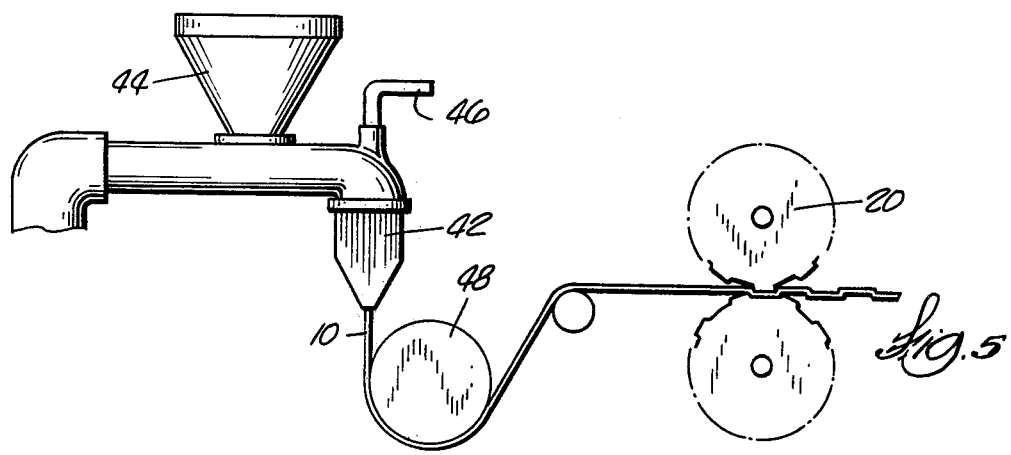
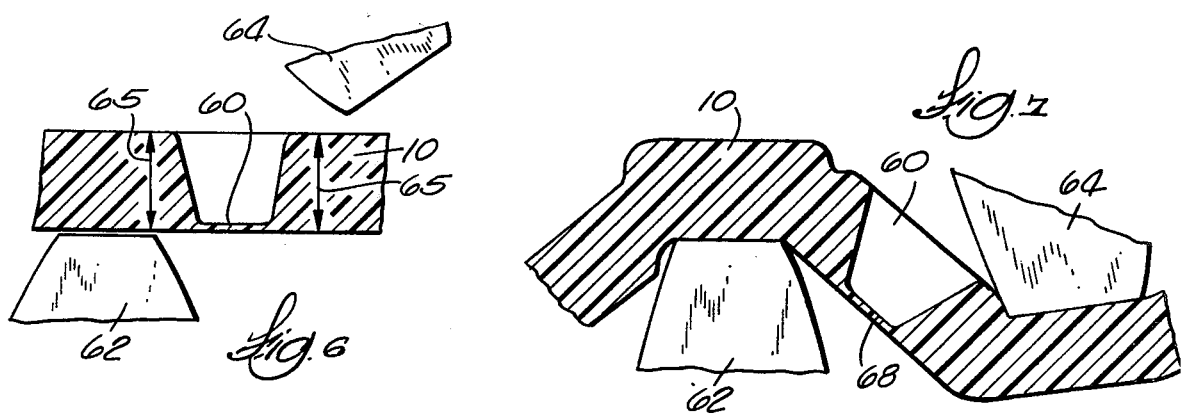

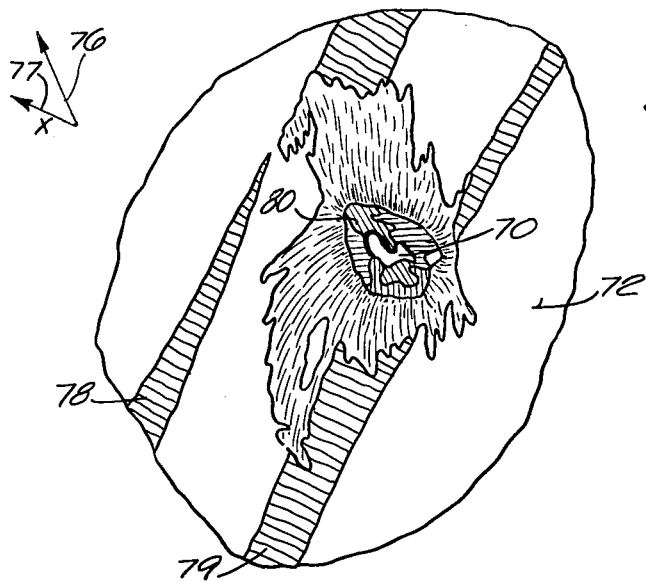
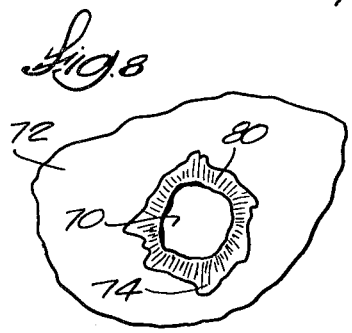
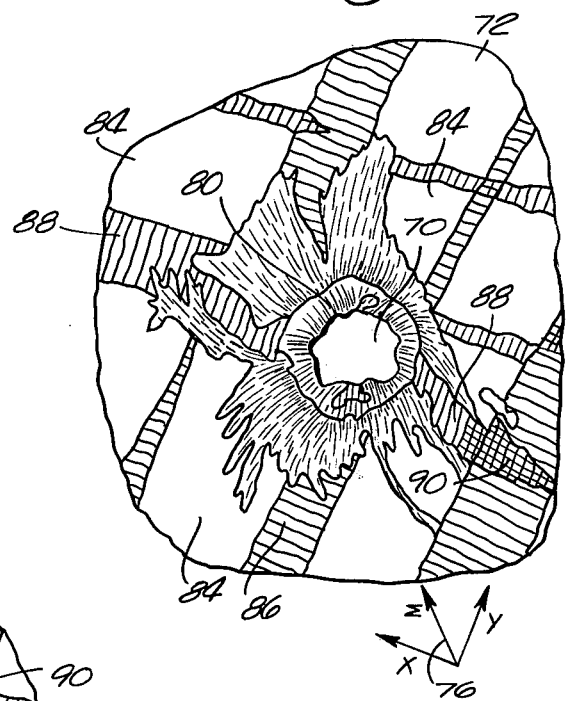
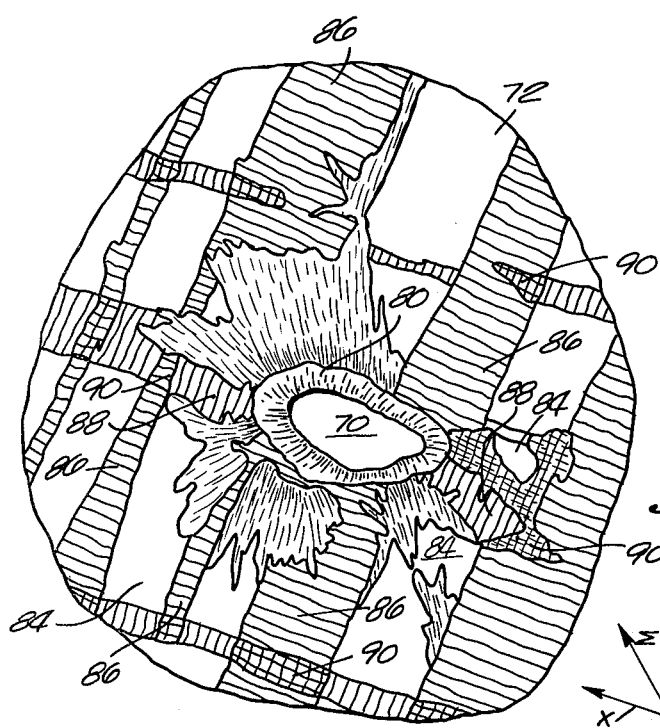

MULTI-APERTURED WEB WITH INCREMENTAL ORIENTATION IN ONE OR MORE DIRECTIONS

BACKGROUND OF THE INVENTION

The invention relates to a non-woven net fabric and a method of making the web or fabric. Various prior art patents such as Patchell U.S. Pat. No. 3,488,415; Seymour U.S. Pat. No. 3,137,746; and Wyckoff U.S. Pat. No. 3,386,876 show non-woven nets. The differential stretching step of the method of the invention provides a web with uniform characteristics without thick junctions found in the prior art which can be undesirable for certain end uses such as diapers or dressings. The thick junctures found in the prior art can cause skin irritation. These prior art patents do not employ the specific gears recited to accomplish the drawing step.

CROSS-REFERENCE TO RELATED APPLICATION

This application is a further development of the subject matter of my pending application, Ser. No. 711,007, now U.S. Pat. No. 4,153,664, issued May 8, 1979 the entire disclosure of which is incorporated herein by reference.

SUMMARY OF THE INVENTION

The invention provides a fabric and process for producing a plastic net-like fabric of perforated plastic film which has been incrementally stretched throughout its area to greatly increase its tensile strength area and drapability.

Webs of synthetic thermoplastic resins capable of melt extrusion or compression extrusion in a molten or softened state are subjected to punching, pressing, piercing or electrostatic discharges either in the molten, softened or solid state to form a pattern of slits, holes or apertures of any shape, size or spacing. Subsequent to the application of the pattern apertures or depressions, the web is differentially drawn to provide increased drapability and strength by subjecting the web to two or more pairs of meshing tooth rollers as disclosed in my pending application, Ser. No. 711,007, now U.S. Pat. No. 4,153,664. Such differential drawing process provides a fabric having a pattern of spaced apart undrawn quadrilateral shaped islands bounded fully on each of their four sides by axially drawn areas. Each undrawn island is also contiguous at each of its four apices to a biaxially drawn area. The differential stretching step also stretches the margins of the apertures or depressions to enlarge the size of the apertures. The size of the apertures can be controlled by selecting the clearance between the meshing tooth rollers and a number of sets of tooth rollers through which the web is drawn. Where the web is provided with depressions such as by embossing prior to a differential stretching step, the depression bottoms can be stretched and ruptured by stretching to provide apertures with marginal flaps which yieldingly and partially enclose the apertures. The aperture size and extent to enclosure thereof by the flaps can be controlled to provide a web pervious to air and vapors but impervious to liquid.

The resulting fabric has the desired strength and drapability for garments, sheets and sterile wraps and is capable of vapor transmission where this property or feature is desirable or required.

Various products can be constructed to take advantage of the controlled permeability of the fabric. Two layers of the fabric can be heat sealed along the margins to form a pouch containing a fabric softener which is controllably released through the apertures into a laundry dryer or transfer of the softener to the fabric during the drying, tumbling operation.

Further objects, advantages and features of the invention will become apparent from the disclosure.

DESCRIPTION OF THE DRAWINGS

FIG. 4 is a schematic diagram of modified apparatus for practicing the invention.

FIG. 5 is a schematic diagram of further modified apparatus for practicing the invention.

FIG. 6 is an enlarged schematic diagram of a perforated web being processed by geat teeth.

FIG. 7 is an enlarged schematic view similar to FIG. 6 of margins of a hole being stretched by gear teeth.

FIG. 8 is an enlarged view of a web with an aperture formed by piercing.

FIG. 9 is an enlarged view of the web shown in FIG. 8 after it has been uni-axially drawn along the X axis by a pass through one set of meshing rollers.

FIG. 10 is a view similar to FIG. 9 with the web being axially drawn along X and y axes.

FIG. 11 is a view similar to FIG. 10 in which the web has been drawn twice along the X axis and one along the Y axis.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIGS. 1 through 5 illustrate various ways of making a net or reticulated web in accordance with the invention. The apparatus disclosed in FIGS. 1 through 5 all employ one or more sets of meshing toothed rollers as disclosed in my pending application, Ser. No. 711,007, now U.S. Pat. No. 4,153,664, as described and for the purpose set forth in that application to provide differential drawing or stretching to increase web strength. The meshing toothed rollers disclosed herein desirably have the characteristics and parameters disclosed in my prior application to obtain the maximum benefits disclosed in that application.

Figure 1:
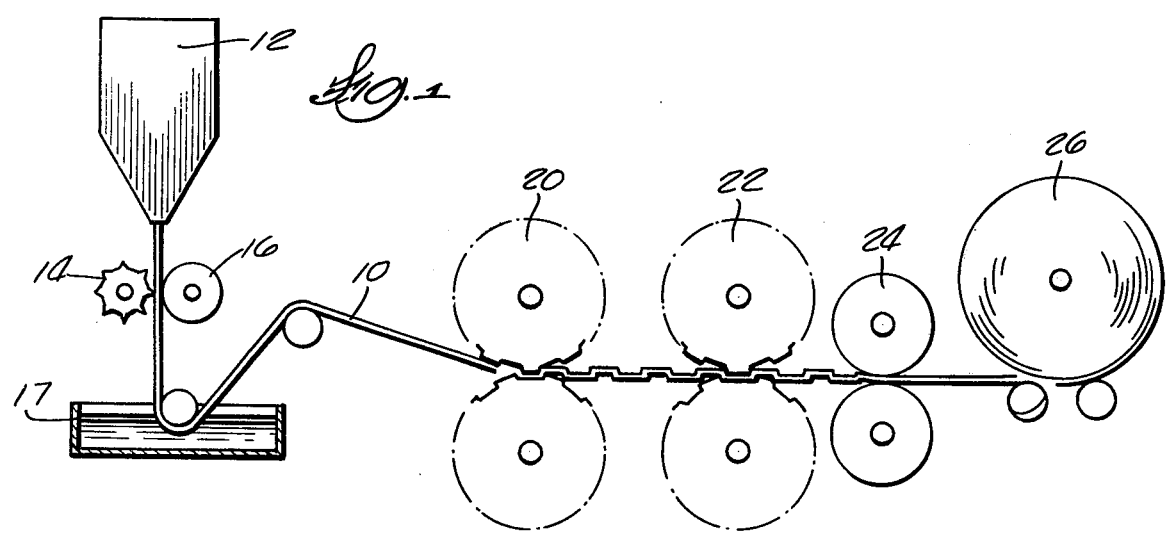
FIG. 1 is a schematic diagram of apparatus for practicing the invention.

FIG. 1 shows a web 10 formed by an extruder 12. The molten film leaving the extruder is apertured or provided with depressions by heated pattern rolls 14 which coact with a heated smooth roll 16. A quenching bath 17 can be provided. FIG. 1 also shows a first pair of meshing stretch rolls 20 and a second pair of stretch rolls 22, calendar rolls 24 and a wind-up roll 26.

Figure 2:
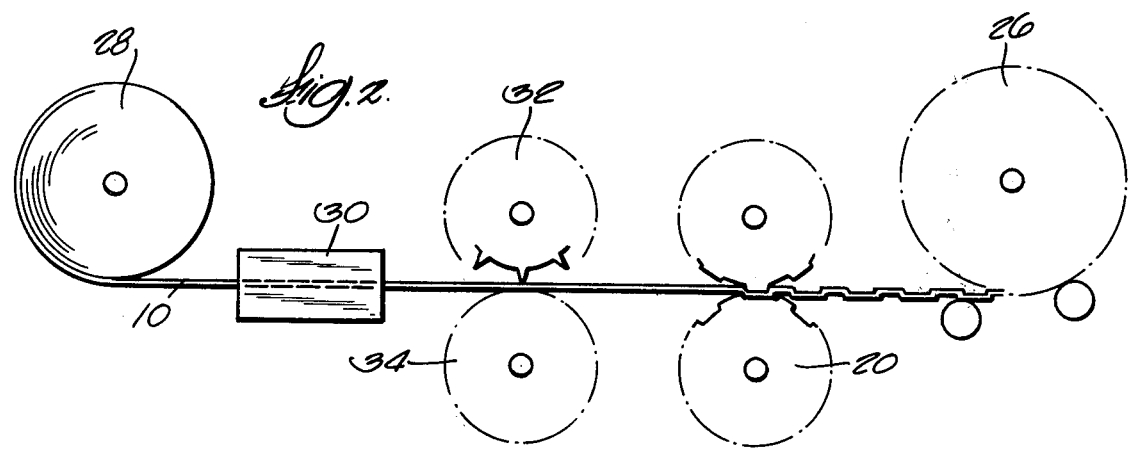
FIG. 2 is a schematic diagram of alternate apparatus for practicing the invention.

FIG. 2 shows a parent roll 28 which supplies a web 10 which travels through a pre-heat oven 30 which softens the web or film 10. Apertured or pattern rolls 32 and 34 provide depressions or apertures in the web. One or more pairs of stretch rolls 20 then stretch the apertured web and it is wound up on a wind-up roll 26.

Figure 3:
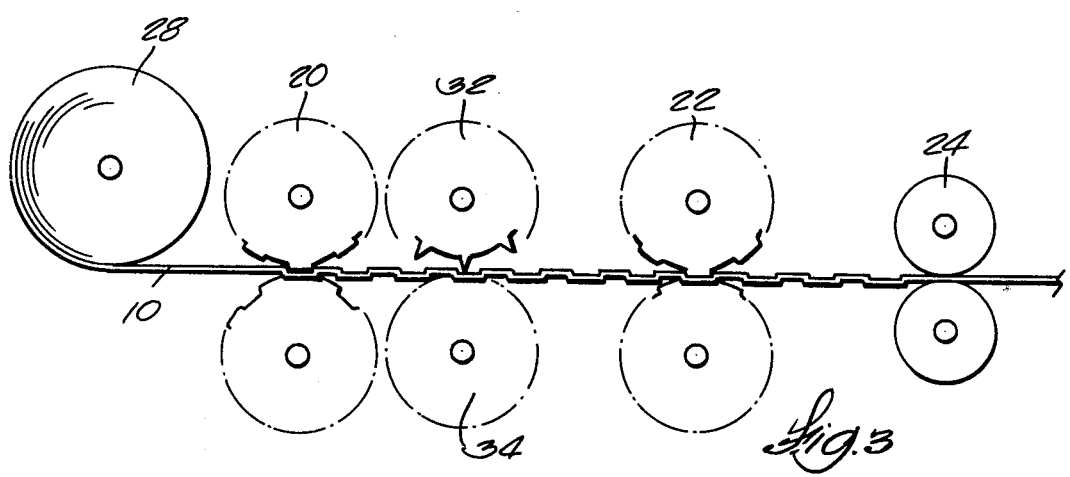
FIG. 3 is a schematic diagram of further alternate apparatus for practicing the invention.

In FIG. 3, the web 10 goes through one pair of stretch rolls 20 and then aperture or depression forming rolls 32, 34 and subsequently passes through a second set or pair 22 of stretch rolls. Thus in FIG. 3 the film or web is pre-drawn by stretch rolls 20 before it is apertured and then is subsequently drawn by one or more additional sets of stretch rolls 22.

In FIG. 4, the web 10 is formed by an extruder 12 and the web goes through a pre-heat oven 30 and is then processed by pattern or aperture rolls 32, 34, a quench bath 17 and one or more pairs 20 of stretch rolls. An oven 36 is provided for setting the net structure and the web then goes to a wind-up roll 26.

In FIG. 5, the film 10 exits from an extruder 42 which is connected to a resin hopper 44. A gas inlet 46 is connected to a source of gas, air, nitrogen dioxide, etc. which is injected into the extruder barrel at or near the delivery end of the extruder 42 under pressure to provide bubbles in the web 10. The web then passes over a chill roll 48 to one or more sets of stretch rolls 20. The stretch rolls 20 will stretch and thus pop the bubbles in the web to provide an apertured web.

FIG. 6 is an enlarged view showing the web 10 with a depression 60 which does not go completely through the web. The web 10 is shown between the teeth 62 and 64 of the pair of meshing toothed rollers. The web 10 has previously had the depressions formed by pattern or aperturing rolls 32. The teeth or projections on an aperturing roll will draw the film around the depression in directions normal to the film plane as shown by arrows 65. This is caused by stretching of the boundary of the hole recess by the teeth or projections. In FIG. 7, the web 10 of FIG. 6 is being stretched by the teeth 62 and 64 which stretch and enlarge the depression 60. The bottoms 68 of the depression is either stretched or ruptured during the stretching process, depending how deep the depression is and the degree of stretch, gear tooth spacing and other parameters.

FIGS. 8 through 13 are drawings based on microphotographs of apertured film taken with polarized light which illustrates the stretching of the film with the stretch rollers and the enlarging of the apertures with multiple passes through the stretch rolls. FIG. 8 shows an aperture 70 in a film 72 which was caused by needle-puncturing of the film. The boundary of the aperture has a few flaps 74 formed by partially stretched and thin web material.

FIG. 9 shows the film 72 after it is drawn by one pass through a set of stretch rollers 22. The machine direction of the web is illustrated by the arrow 76 and the stretching is along the X axis 77. The aperture 70 has been enlarged by the stretching. The bands 78 and 79 have been stretched in the X direction and the area 80 is the margin of the aperture 70 which was molecularly oriented in the direction normal to the film plane during the puncturing process.

In FIG. 10, the film 72 has been run through two sets of meshing toothed rollers, once in the X direction and once in the Y direction. There are substantial undrawn areas or islands 84 surrounding the hole 70. The islands are bounded by zones such as 86 which are drawn only in the X direction and zones 88 drawn in the Y direction, and zones 90 drawn in both the X and Y directions also appear. The margins 80 of the aperture have been drawn in both the X and Y directions. The aperture 70 is increased in size in FIG. 10 by the stretching along the X and Y axes.

Referring to FIG. 11, the film 72 has gone through three passes through meshing toothed rollers, two passes in the X direction and one pass in the Y direction. The film shown in FIG. 10 went through an additional pass which stretched in the X direction once again. The undrawn islands 84 have been reduced in size in FIG. 11. The zones 88 drawn only in the Y direction appear but are reduced in length by zones drawn in the X direction. Zones drawn both in the X and Y directions are designated 90. In FIG. 10, the hole 70 has been elongated in the X direction by the additional stretch along the X axis. The area of the hole size of hole 70 is also increased as compared with FIG. 10.

Figure 12:
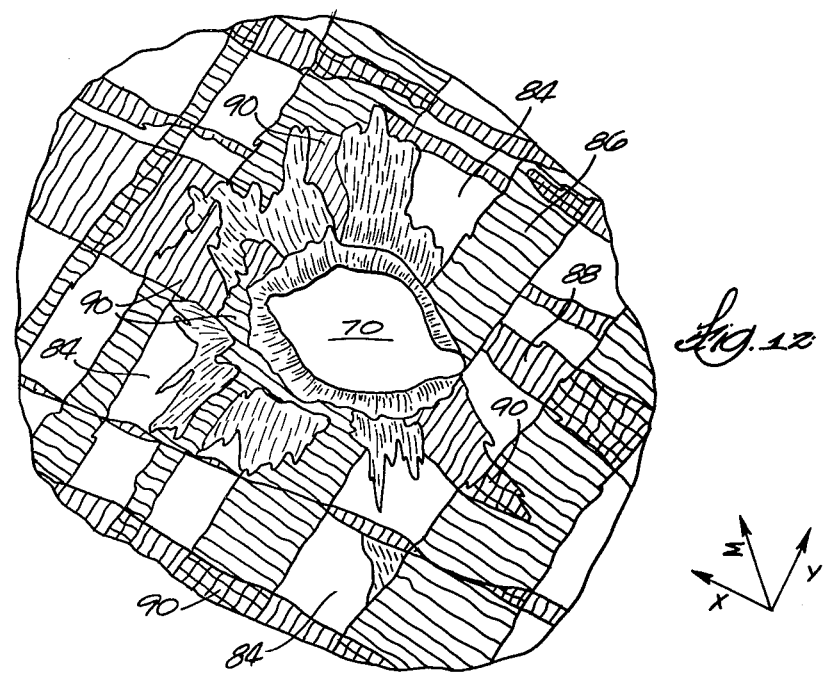
FIG. 12 is a view similar to FIG. 11 with the web drawn twice along the X axis and twice along the Y axis.

In FIG. 12, the web shown in FIG. 11 has gone through an additional set of rollers in the Y direction so that stretching has occured twice in the X direction and twice in the Y direction. The undrawn islands 84 have been reduced in size and the total web area covered by the zones drawn in the X direction 86 and the Y direction 88 has increased. The zones commonly drawn in both the X and Y directions have also increased. The aperture 70 has gotten substantially larger over the aperture 70 in FIGS. 10 and 11.

Figure 13:
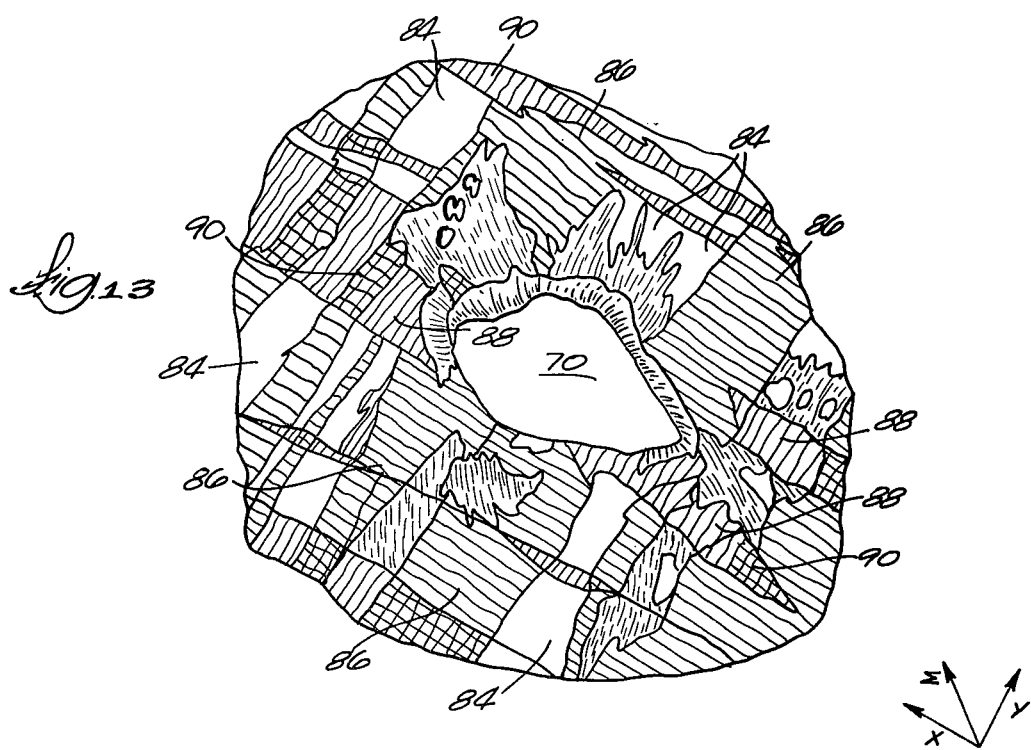
FIG. 13 is a view similar to FIG. 12 with the web drawn three times along the X axis and twice along the Y axis.

Referring to FIG. 13, the web that has gone through FIG. 12 has gone through one more set or pair of meshing toothed rollers, to draw a third time in the X direction. The undrawn areas 84 have gotten smaller and the area of the web covered by zones stretched in the X direction only is increased and the number of zones 90 drawn in both the X and Y directions has also increased. The aperture has gotten substantially larger than that shown in FIG. 12 and the area of the flap surface relative to the through opening has increased.

The illustrations 9 through 13 show that the area surrounding an aperture in a film can be provided with undrawn islands to substantially increase the strength of the web to prevent rupturing of the hole when the web or the fabric in which it is ultimately employed is subject to stresses. The quilt-like pattern, with undrawn islands interspersed by axially drawn zones, substantially increases the strength. The area of the opening can be controlled by the number of passes through the stretching rollers. The undrawn areas or islands shown in the apertures will yield under shock loads, allowing the web or net to stretch rather than rupture as in the prior art patents.

Inasmuch as the drawing of an apertured web in accordance with the invention is drawn in increments across its entire width, the ribs and junctures are also drawn with the result that the ribs and junctures around the apertures are substantially the same thickness, as compared with prior art webs or nets that have thick junctions connected by thin ribs or bars. The thick junctures in prior aft webs provide a rough surface, making the net unsatisfactory for many uses. Nets which have thick junctures and thus a rough surface are not desirable when used against the skin in pads such as diapers, dressings, etc. because the thick junctures can cause skin irritation.

What is claimed is:

1. A perforated web formed by the process of differentially drawing a web with a quilted pattern of cold drawn areas surrounding undrawn islands comprising the steps of providing a web having at least in part cold drawable polymeric material, perforating the web to provide a pattern of spaced apertures and drawing the web in a first direction and providing a pair of meshing gears having a tooth form to provide rolling contact of the teeth at the pitch circles to provide incremental squeezing and cold stretching of the web while below a heat softened state between meshing teeth along a line of action for more than one tooth wherein the relative tooth height of the teeth on the gears is between 2 and 29 and wherein the relative tooth height is equal to the tooth height in inches divided by the original undrawn web thickness in inches and the teeth being at a transverse angle relative to the direction of draw in the first direction and moving a web through the gears to provide stretched and unstretched zones including generally polygonal shaped undrawn islands.

2. In a method of forming a perforated web comprising the steps of providing a web having at least some cold drawable orientable thermoplastic material drawable at cold drawable temperature and providing first and second pairs of meshing gears having a tooth form of one of involute and cycloidal and a pressure angle of between 5° and 40° and a circular pitch less than the product of the web thickness times one hundred with the gear teeth providing rolling contact of the teeth at the pitch circles to provide incremental and simultaneous squeezing and stretching of the web at multiple points on the web between meshing teeth along a line of action for more than one tooth and the teeth of said second pair of gears being at a transverse angle relative to the teeth of the first pair of gears, moving a web through the first gear pair to provide parallel and alternate cold stretched and unstretched zones, and moving the web through the second set of meshing toothed rollers at the speed of the teeth of the rollers to superimpose a second pattern on the web having alternate cold stretched and unstretched zones to provide generally quadrilaterally shaped undrawn islands bounded fully on each of their four sides by an axially drawn molecularly oriented area and each quadrilateral island being contiguous at each of its four apices to a biaxially drawn molecularly oriented area and said second set of rollers stretching the apertures to a preselected size and spacing, the improvement comprising the step of perforating the web to form a plurality of apertures prior to moving the web through the second set of meshing toothed rollers.

3. In a method of cold drawing at a temperature below its melting range a web having at least in part cold drawable polymeric material comprising the steps of providing a set of meshing toothed gears to incrementally squeeze the web between meshing teeth along a line of action for more than one tooth to cold draw part of said web and wherein the relative tooth height of the teeth on the gears is between 5 and 15 and wherein the relative tooth height is equal to the tooth height in inches divided by the original undrawn web thickness in inches, moving the web through the rollers to form a pattern of substantially parallel undrawn areas alternating with parallel axially drawn areas, the improvement comprising the step of perforating the web after drawing the same.

4. In a method of differentially cold drawing a web having at least in part cold drawable polymeric material with a quilted pattern of drawn areas surrounding undrawn islands providing multiple pairs of meshing toothed gears with at least one set of gears having a tooth form to provide rolling contact of the teeth at the pitch circles to provide incremental squeezing and stretching of the web between meshing teeth along a line of action for more than one tooth to cold draw part of said web below its softening point and the teeth being at a transverse angle relative to the teeth of another set of rollers, moving a web through the pairs of gears to provide the web with generally polygonal shaped undrawn islands bounded on some of their sides by cold drawn areas, the improvement comprising the step of perforating the web prior to squeezing and stretching the web.

* * * * *